(12) United States Patent
Wang (10) Patent No.: US 6,827,438 B1
(45) Date of Patent: Dec. 7, 2004

(54) COMBINATION DEVICE FOR ATTACHING AUXILIARY SPECTACLES TO MAIN SPECTACLES

(76) Inventor: Yun-Cheng Wang, No. 21, Tienhsia Rd., Yuanli Chen, Miaoli Hsien (TW)

( * ) Notice: Subject to any disclaimer, the term of this patent is extended or adjusted under 35 U.S.C. 154(b) by 0 days.

(21) Appl. No.: 10/640,002

(22) Filed: Aug. 14, 2003

(51) Int. Cl.[7] ................................................. G02C 7/08
(52) U.S. Cl. ........................................ 351/58; 351/48
(58) Field of Search ............................... 351/47, 48, 57, 351/58, 140; D16/900

(56) References Cited

U.S. PATENT DOCUMENTS 5,164,749 A * 11/1992 Shelton ........................ 351/47
5,694,193 A * 12/1997 Murphy et al. ............... 351/58
6,254,232 B1 * 7/2001 Friedman ..................... 351/47

* cited by examiner

Primary Examiner—Huy Mai
(74) Attorney, Agent, or Firm—Dennison, Schultz, Dougherty & MacDonald (57) ABSTRACT

A combination device for attaching auxiliary spectacles to main spectacles has a base, a clip and a resilient member. The base is adapted to be mounted on the nose bridge of the auxiliary spectacles and has a recess with an opening. The clip is pivotally attached to the base to close of the opening of the recess. The clip has a length longer than that of the base to make the distal end extend away from the base and an inclined surface formed on the distal end. The resilient member is mounted between the base and the clip to provide a restitution force to the clip. Accordingly, a user can operate, without using hands, the combination device to attach or detach the auxiliary spectacles onto or from the main spectacles, and the use of the auxiliary spectacles is convenient.

14 Claims, 8 Drawing Sheets

COMBINATION DEVICE FOR ATTACHING AUXILIARY SPECTACLES TO MAIN SPECTACLES

BACKGROUND OF THE INVENTION

1. Field of the Invention

The present invention relates to a combination device, and more particularly to a combination device between main spectacles and auxiliary spectacles and that can conveniently attach the auxiliary spectacles to the main spectacles.

2. Description of Related Art

To improve the function of a pair of spectacles, auxiliary spectacles, such as sunglasses, can be attached to the main spectacles. To attach the auxiliary spectacles to the main spectacles, a combination device is mounted between the pairs of spectacles. In a first conventional art, the combination device comprises magnetic elements respectively mounted on the main and the auxiliary spectacles. With the attractive effect provided by the magnetic elements, the auxiliary spectacles can be securely attached to the main spectacles.

However, it is necessary to mount magnetic elements onto both the main and auxiliary spectacles and thus the use of the auxiliary spectacles with a combination device is not versatile. In addition, the attractive effect provided by the magnetic elements of the conventional combination device is not enough to hold the auxiliary spectacles on the main spectacles when the users are running or jumping, such that the auxiliary spectacles easily fall from the main spectacles. Furthermore, the magnetic elements must be mounted on precise positions on the main and auxiliary spectacles, otherwise the magnetic elements on the auxiliary spectacles cannot mate with the magnetic elements on the main spectacles. Accordingly, to manufacture the main and the auxiliary spectacles is troublesome, and arrangement of the magnetic elements will make the appearance of the main spectacles unattractive to consumers.

In another conventional prior art, a conventional combination device is an engaging device mounted on the auxiliary spectacles and clipped onto the frame of the main spectacles. With the engaging device, magnetic elements are not needed and to use and to manufacture the auxiliary spectacles are easy.

However, the conventional engaging device is heavy and so to wear the main spectacles and auxiliary spectacles with a conventional engaging device is inconvenient for the user. In addition, hands are needed for a user to operate the conventional engaging device to attach or detach the auxiliary spectacles to or from the main spectacles, and so the use of the conventional combination device is inconvenient.

To overcome the shortcomings, the present invention tends to provide a combination device for main and auxiliary spectacles to mitigate or obviate the aforementioned problems.

SUMMARY OF THE INVENTION

The main objective of the invention is to provide a combination device for conveniently attaching auxiliary spectacles onto main spectacles. The combination device has a base, a clip and a resilient member. The base is adapted to be mounted on the nose bridge of the auxiliary spectacles and has a recess with an opening defined in one face of the base. The clip is pivotally attached to the base to close of the opening of the recess. The clip has a length longer than that of the base to make the distal end extend away from the base, and an inclined surface formed on the distal end. The resilient member is mounted between the base and the clip to provide a restitution force to the clip. In such an arrangement, hands are not needed for a user to operate the combination device to attach or detach the auxiliary spectacles onto or from the main spectacles, and the use of the auxiliary spectacles is convenient.

Other objects, advantages and novel features of the invention will become more apparent from the following detailed description when taken in conjunction with the accompanying drawings.

DETAILED DESCRIPTION OF PREFERRED EMBODIMENT

With reference to FIGS. 1 to 4, a combination device for attaching a pair of auxiliary spectacles (50) to a pair of main spectacles (40) in accordance with the present invention comprises a base (10), a clip (20) and a resilient member (30). The base (10) is mounted on the nose bridge (52) of the auxiliary spectacles (50) and has two sides (not numbered) and multiple faces including a top (not numbered), a bottom (not numbered), a front (not numbered) and a rear (not numbered). The front of the base (10) is adapted to be mounted on the nose bridge (52) of the auxiliary spectacles (50). The base (10) has a length crossing between the top and the bottom and a recess (12) with an opening defined in the rear crossing the sides.

The clip (20) is pivotally attached to a rear of the base (10) at a position near the top to close the opening of the recess (12). The clip (20) has a length, two sides, a distal end and a proximal end. The proximal end of the clip (20) is pivotally attached to the base (10). The length of the clip (20) is longer than that of the base (10) to make the distal end of the clip (20) extend away from the bottom of the base (10), and an inclined surface (28) is formed on the distal end of the clip (20). In practice, a concave portion (18) is defined in the rear of the base (10), and a convex portion (26) is formed on the proximal end of the clip (20) and is received in the concave portion (18) in the base (10). With the arrangements of the concave portion (18) and the convex portion (26), the pivotal rotation of the clip (20) relative to the base (10) is smooth.

Figure 1:
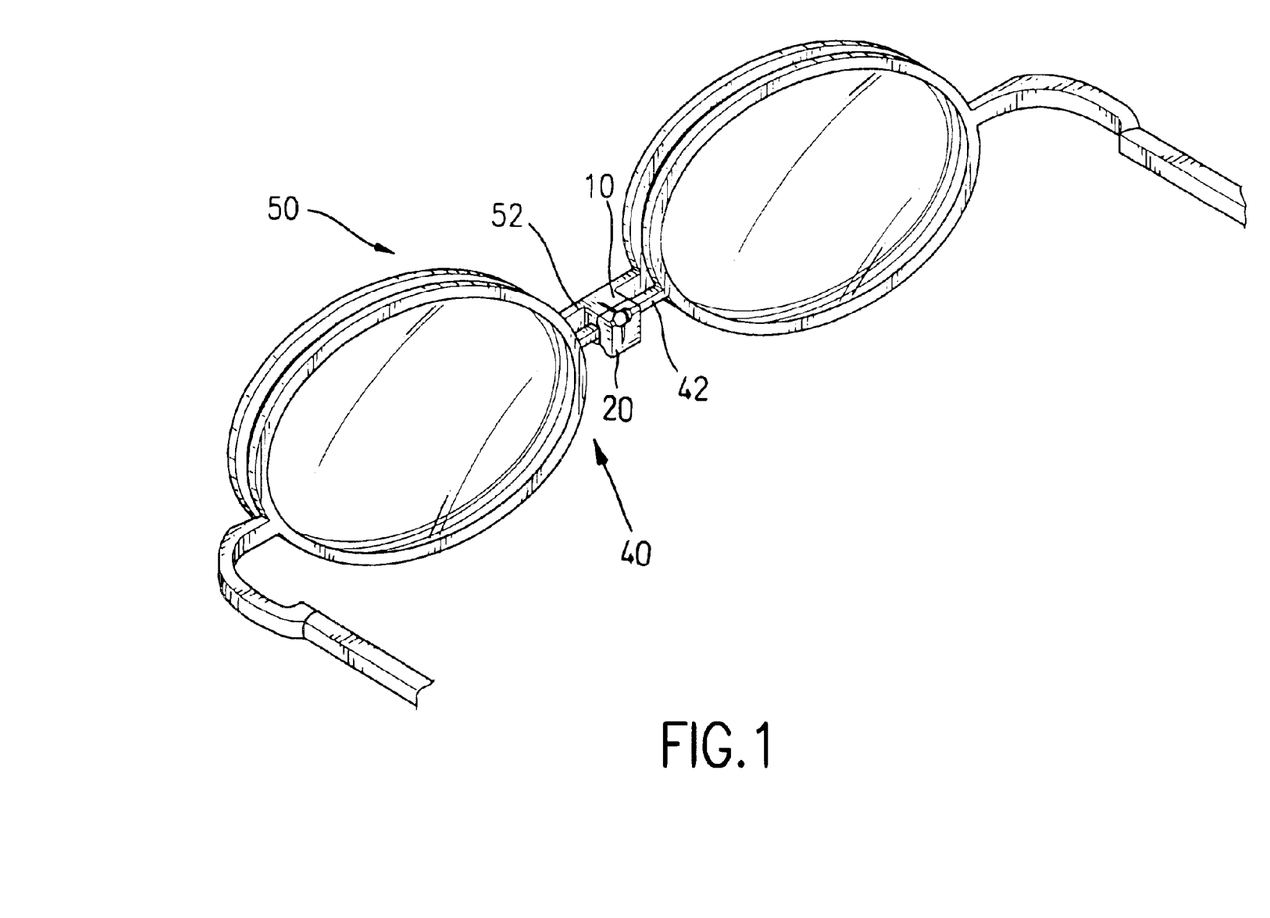
FIG. 1 is a perspective view of a pair of main spectacles and a pair of auxiliary spectacles with a combination device in accordance with the present invention.
Figure 2:
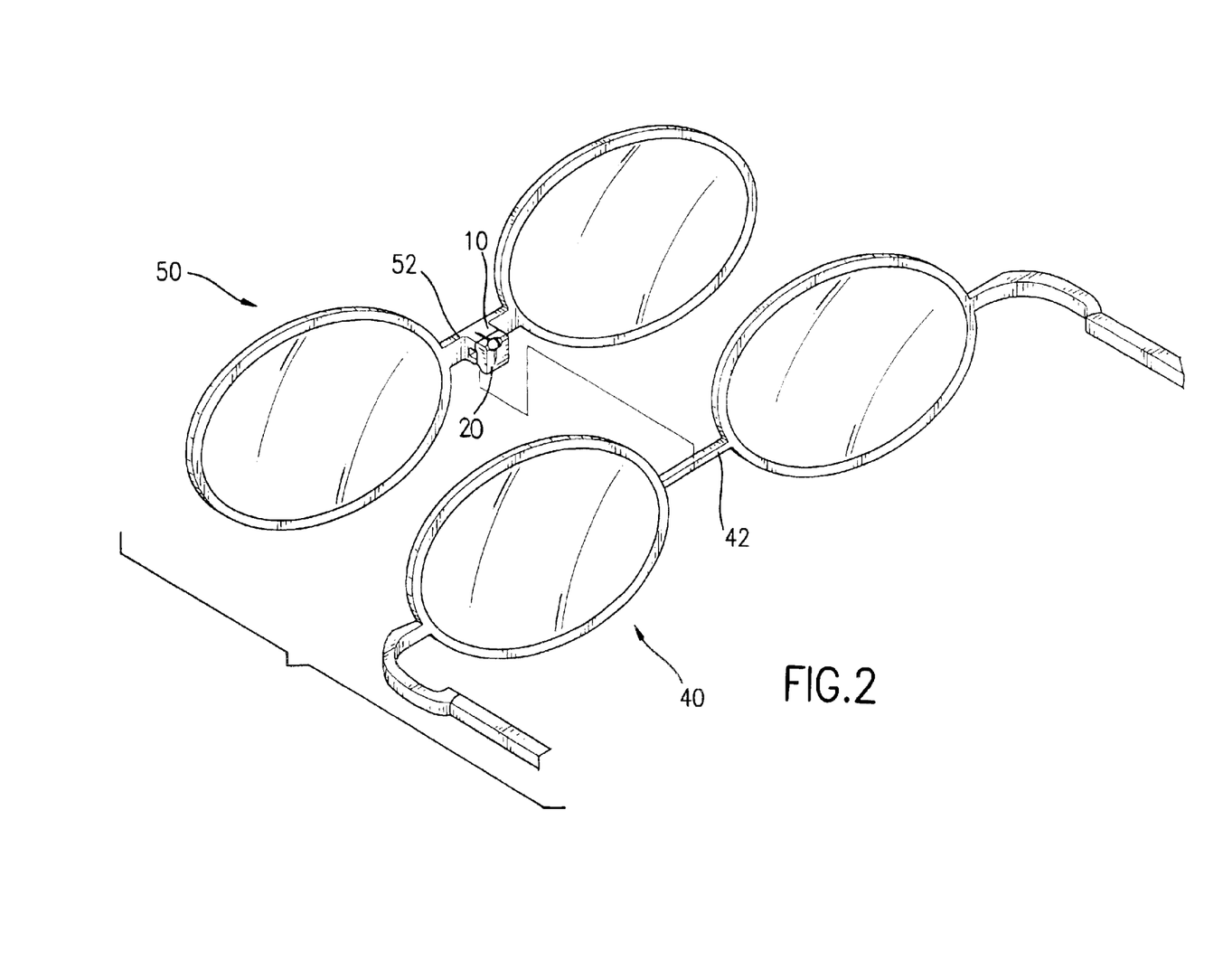
FIG. 2 is an exploded perspective view of the main spectacles and the auxiliary spectacles with the combination device in FIG. 1.
Figure 3:
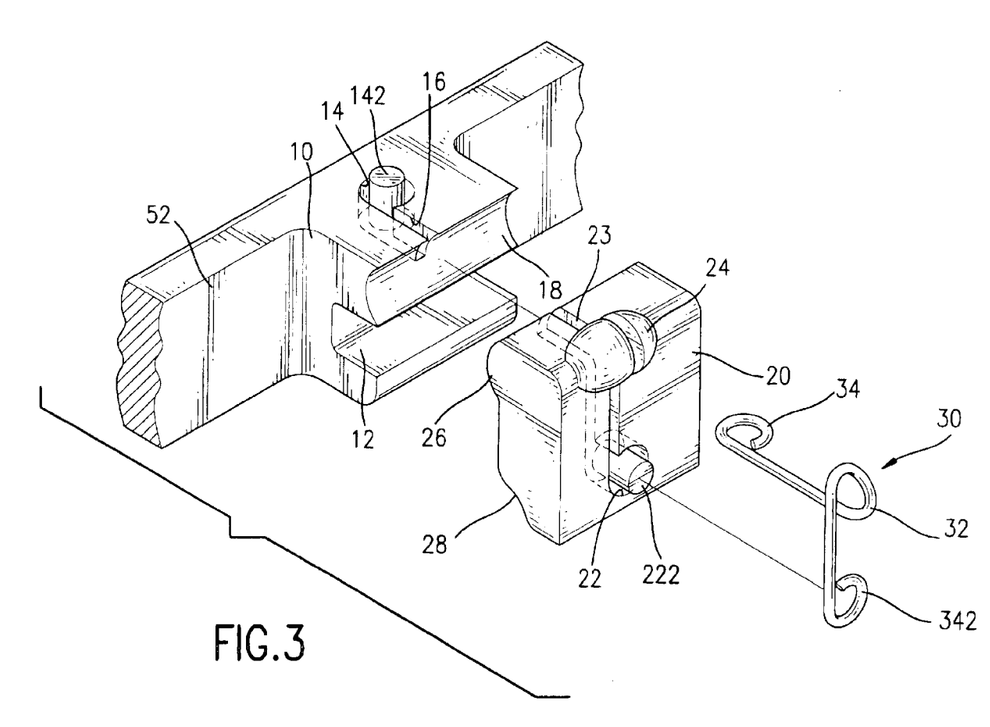
FIG. 3 is an exploded perspective view of the combination device in FIG. 1.
Figure 4:
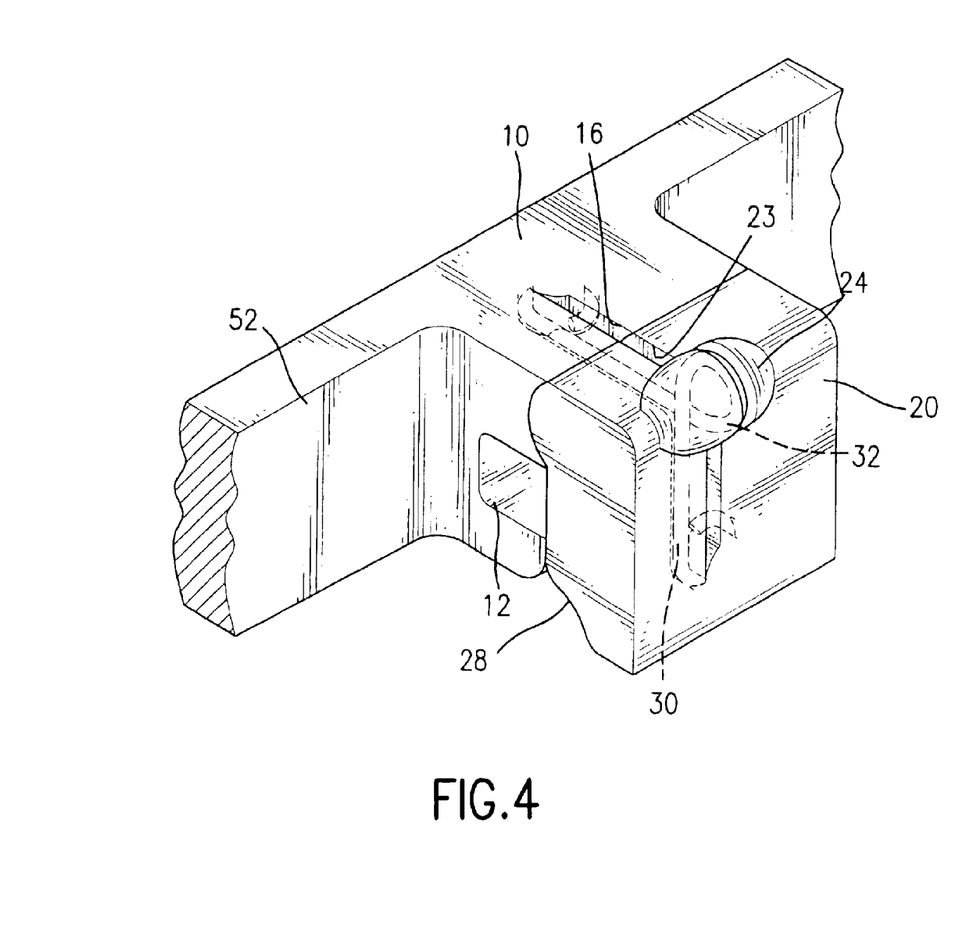
FIG. 4 is an enlarged perspective view of the combination device in FIG. 1.
Figure 5:
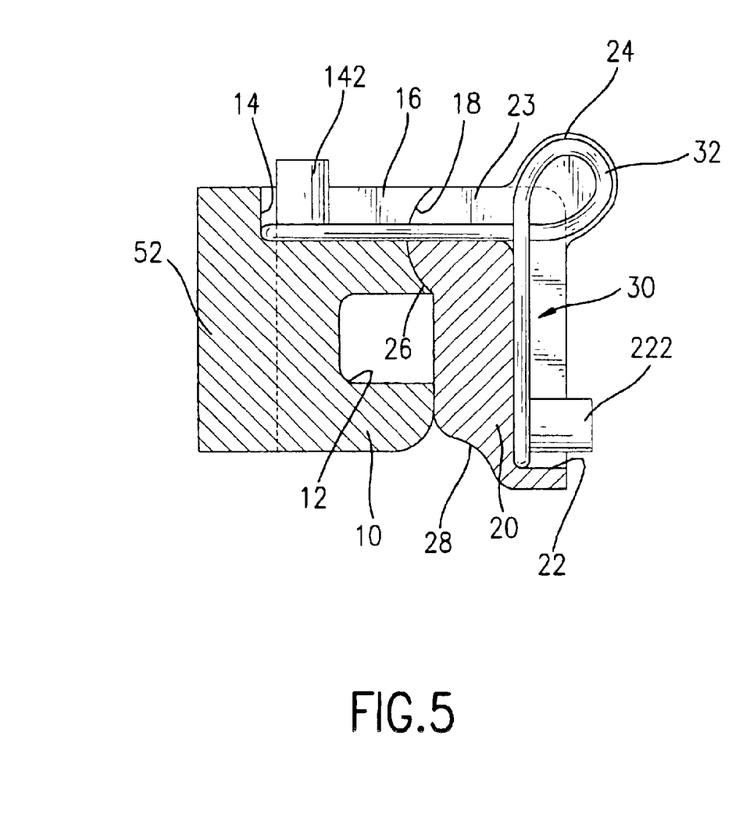
FIG. 5 is a side plan view in partial cross section of the combination device in FIG. 1.
Figure 6:
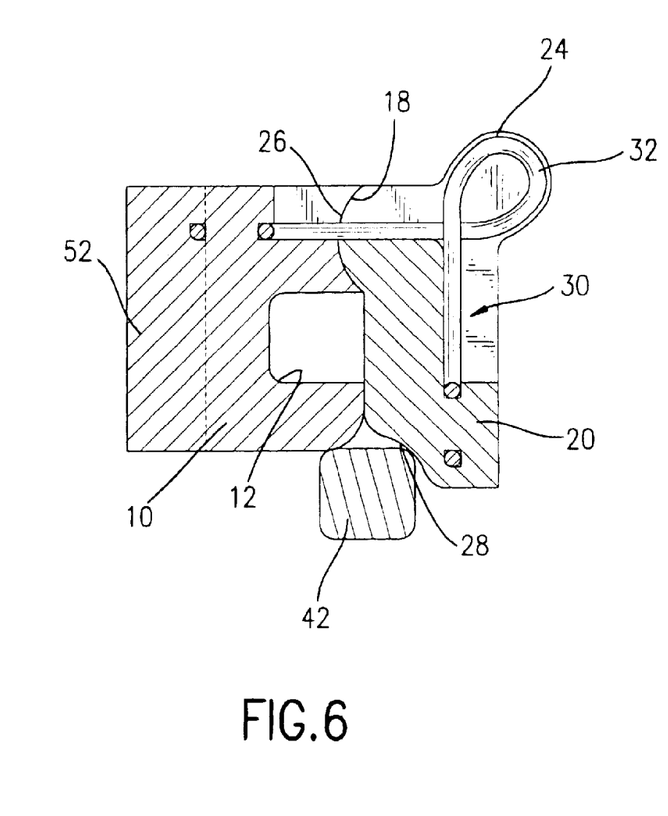
FIG. 6 is an operational side plan view in partial cross section of the combination device in FIG. 1.
Figure 7:
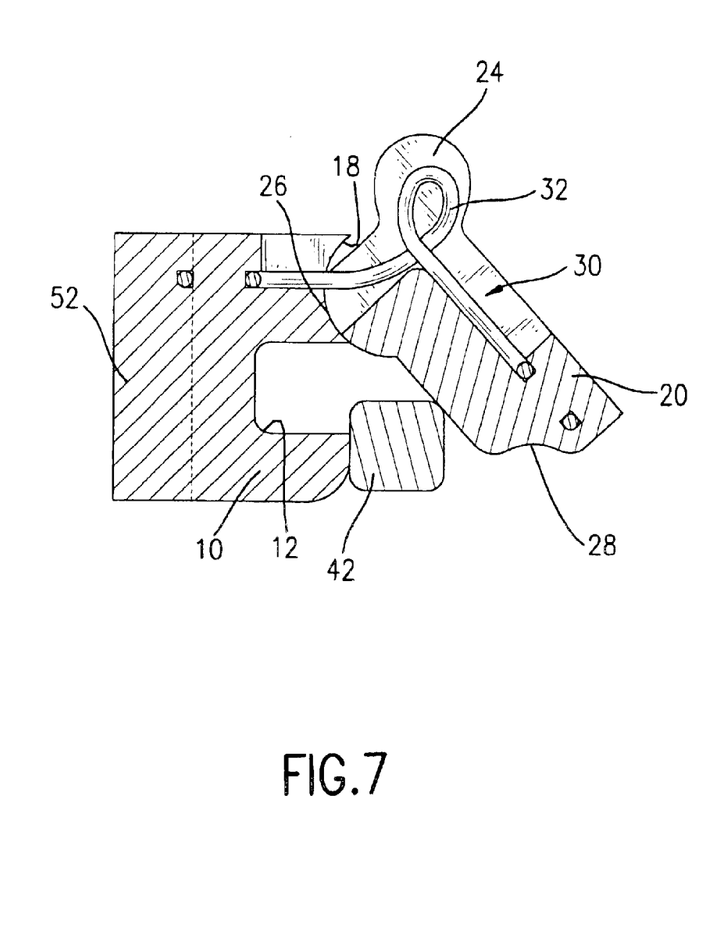
FIG. 7 is an operational side plan view in partial cross section of the combination device in FIG. 1 showing that the clip is pushed to pivotally rotate relative to the base by the nose bridge of the main spectacles.

The resilient member (30) is mounted between the base (10) and the clip (20) to provide a restitution force to the clip (20). The resilient member (30) is L-shaped and has a middle portion (not numbered) formed with a resilient loop (32). Two hooks (34,342) are respectively formed on two ends of the resilient member (30). To attach the resilient member (30) to the base (10) and the clip (20), with further reference to FIGS. 5 and 6, a first hole (14) with a bottom is defined in the top of the base (10), and a first groove (16) is defined in the top and in communication with the first hole (14). A first stub (142) is formed on and extends from a bottom face defining the first hole (14). In practice, the first stub (142) extends out from the first hole (14). A second hole (22) is defined in the side of the clip (20) away from the base (10) and a bottom face defines a bottom of the second hole (22). An L-shaped second groove (23) is defined in the clip (20) along the distal end and the side of the clip (20). The second groove (23) has a first end (not numbered) communicating with the second hole (22) and a second end (not numbered) aligning and communicating with the first groove (16) in the base (10). A second stub (222) is formed on and extends from the bottom of the second hole (22), and the second stub (222) extends out from the second hole (22).

The resilient member (30) is received in the first groove (16) in the base (10) and the second groove (23) in the clip (20), and the hooks (34,342) on the resilient member (30) respectively hook around the first and second stubs (142, 222). Optionally, two blocks (24) are respectively formed on two sides of the second groove (23) and correspond to the resilient loop (32) of the resilient member (30) to receive the resilient loop (32) between the blocks (24). With the arrangement of the blocks (24), the user can be kept from touching with the resilient loop (32) of the resilient member (30).

After putting the resilient member (30) into the grooves (16,23), tops of the stubs (142,222) on the base (10) and the clip (30) are deformed in a conventional manner such as using a heat gun, to respectively fill the first and the second holes (14,22) so as to enclose the holes (14,22). Consequently, the resilient member (30) is securely attached to the base (10) and the clip (20) and is not detachable from the base (10) and the clip (20).

With reference to FIGS. 1 and 6 to 8, when the user wants to attach the auxiliary spectacles (50) to the main spectacles (40), the auxiliary spectacles (50) with the combination device are moved to a position where the inclined surface (28) on the clip (20) abuts against the nose bridge (42) of the main spectacles (40). The clip (20) is pushed to pivotally rotate relative to the base (10) by the nose bridge (42) of the main spectacles (40). A gap is defined between the base (10) and the clip (20) to let the nose bridge (42) pass through the gap and into the recess (12) in the base (10). In the meantime, the resilient member (30) is twisted such that a compression tension is stored in the resilient loop (32). When the nose bridge (42) is received in the recess (12) in the base (10), the clip (20) will be automatically rotated to close the opening of the recess (12). Accordingly, the auxiliary spectacles (50) can be securely attached to the main spectacles (40) with the combination device.

Figure 8:
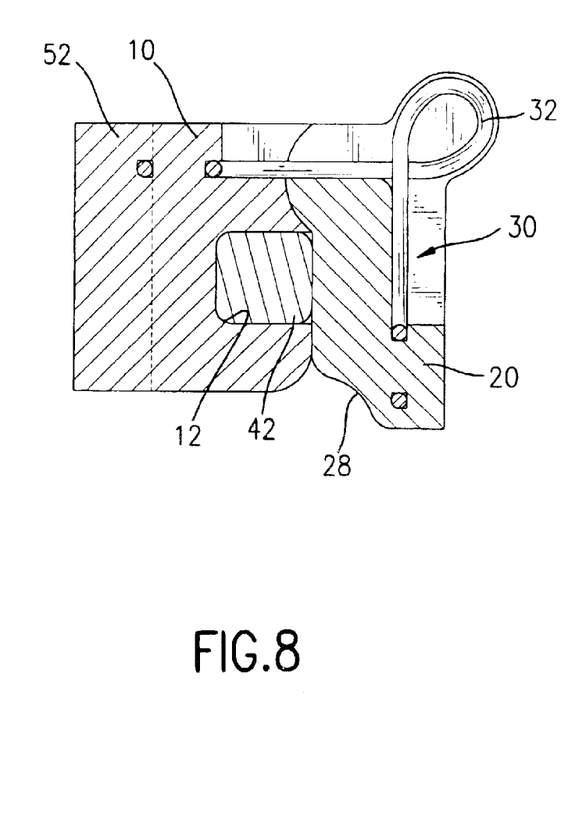
FIG. 8 is a side plan view in partial cross section of the combination device in FIG. 1 showing that the auxiliary spectacles are attached to the main spectacle with the nose bridge of the main spectacles being received in the recess in the base.

When the user wants to detach the auxiliary spectacles (50) from the main spectacles (40), the user only needs to move the auxiliary spectacles (50) upwardly. The clip (20) is automatically pushed away from the base (10) to let the nose bridge (42) of the main spectacles (40) escape from the recess (12) in the base (10). Accordingly, hands are not needed for a user to operate the combination device when the user wants to attach or detach the auxiliary spectacles (50) onto or from the main spectacles (40). The use of the auxiliary spectacles (50) with a combination device is convenient. In addition, auxiliary spectacles (50) with a combination device in accordance with the present invention can be conveniently fitted with any type of main spectacles (40), and the use of the auxiliary spectacles (50) is versatile. Furthermore, to modify the main spectacles (40) is not necessary, so the appearance of the main spectacles (40) will not be influenced by the combination device and is aesthetically pleasing.

Figure 9:
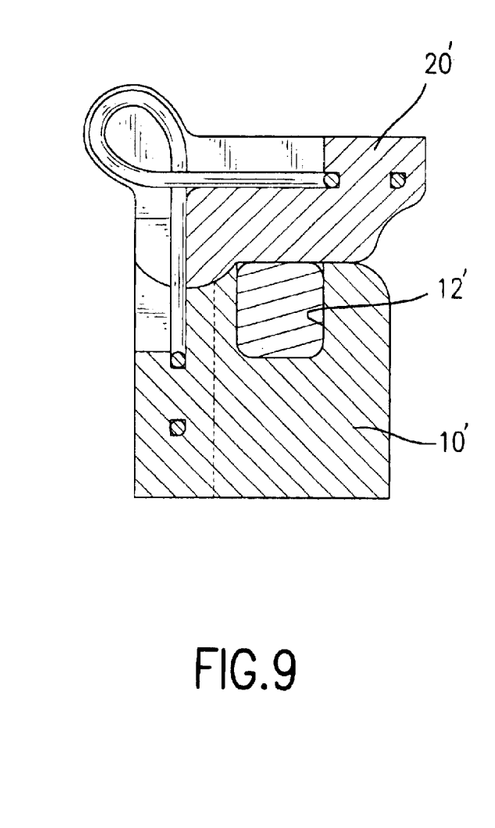
FIG. 9 is a side plan view in partial cross section of a second embodiment of a combination device in accordance with the present invention.
Figure 10:
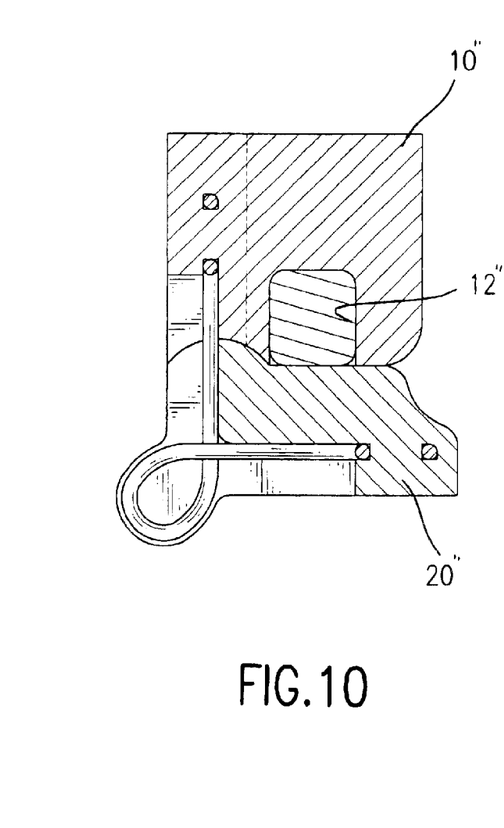
FIG. 10 is a side plan view in partial cross section of a third embodiment of a combination device in accordance with the present invention.
Figure 11:
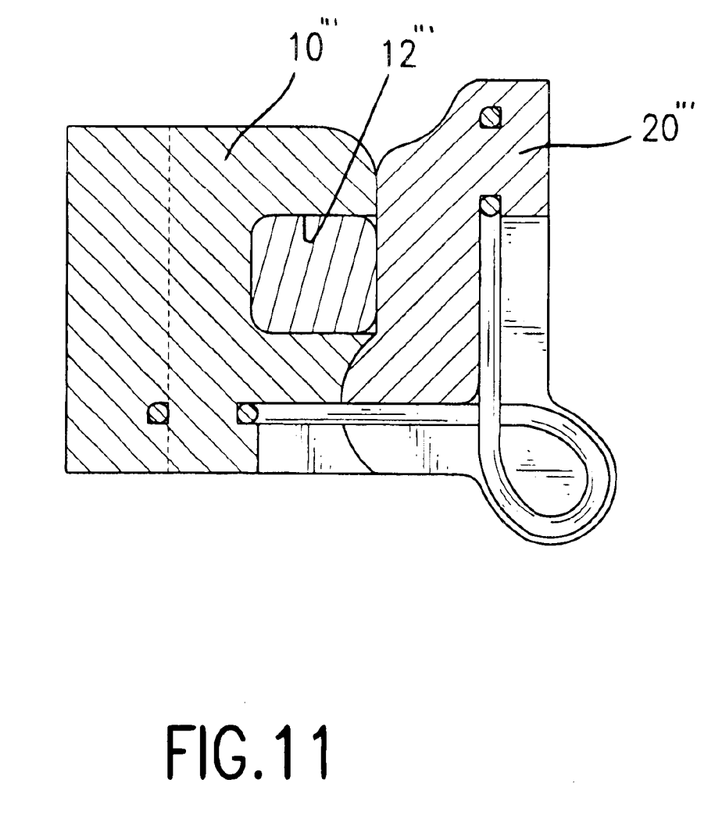
FIG. 11 is a side plan view in partial cross section of a fourth embodiment of a combination device in accordance with the present invention.

In another embodiment, with reference to FIGS. 9 and 10, the recess (12', 12") is selectively defined in the top or the bottom of the base (10',10"), and the clip (20',20") is pivotally attached to the top or the bottom of the base (10',10") to close the recess (12',12"). In a fourth embodiment, with reference to FIG. 11, the recess (12''') is defined in the rear of the base (10'''), and the clip (20''') is pivotally attached to the rear of the base (10''') at a position near the bottom of the base (10'''). With the alternative embodiments of the combination devices, the auxiliary spectacles (50) can be attached to or detached from the main spectacles (40) from different directions so as to fit with needs of different users.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A combination device for attaching a pair of auxiliary spectacles with a nose bridge to a pair of main spectacles, the combination device comprising:

a base with two sides and multiple faces including a top, a bottom, a front and a rear, wherein the front of the base is adapted to be mounted on the nose bridge of the auxiliary spectacles, and the base having:

a length crossing between the top and the bottom;

a recess defined in one of the faces crossing the sides and having an opening in the face in which the recess is defined;

a clip having two sides, a distal end and proximal end pivotally attached to the base at the face in which the recess is defined to close the opening of the recess and further having a length longer than that of the base to make the distal end extend away from the base, and an inclined surface formed on the distal end; and a resilient member mounted between the base and the clip to provide a restitution force to the clip.

2. The combination device as claimed in claim 1, wherein the resilient member is L-shaped and has a middle portion formed with a resilient loop.

3. The combination device as claimed in claim 2, wherein the base has a first stub formed on one face that is adjacent to the face with the recess;

the clip has a second stub formed on one side away from the base; and the resilient member has two hooks respectively formed on two ends of the resilient member and mounted around the first and second stubs.

4. The combination device as claimed in claim 3, wherein the base has a first hole with a bottom defined in the face with the first stub and the first stub formed on a face defining the bottom of the first hole;

the base further having a first groove formed on the face with the first stub and communicating with the first hole;

the clip has a second hole with a bottom defined in the side with the second stub and the second stub formed on the bottom of the second hole;

the clip further having an L-shaped second groove with two sides along the distal end and the side with the second hole of the clip, and the second groove having a first end communicating with the second hole and a second end aligning and communicating with the first groove in the base; and the resilient member is received in the first groove in the base and the second groove in the clip.

5. The combination device as claimed in claim 4, wherein the clip further has two blocks respectively formed on two sides of the second groove and corresponding to the resilient loop of the resilient member to receive the resilient loop between the blocks.

6. The combination device as claimed in claim 5, wherein the base has a concave portion defined in the face with the recess; and the clip has a convex portion formed on the proximal end and received in the concave portion in the base.

7. The combination device as claimed in claim 6, wherein the recess is defined in the rear of the base;

the clip is pivotally attached to the rear of the base at a position near the top of the base; and the first stub and the first groove are formed on the top of the base.

8. The combination device as claimed in claim 6, wherein the recess is defined in the rear of the base;

the clip is pivotally attached to the rear of the base at a position near the bottom of the base; and the first stub and the first groove are formed on the bottom of the base.

9. The combination device as claimed in claim 6, wherein the recess is defined in the top of the base;

the clip is pivotally attached to the top of the base; and the first stub and the first groove are formed on the front of the base.

10. The combination device as claimed in claim 6, wherein the recess is defined in the bottom of the base;

the clip is pivotally attached to the bottom of the base; and the first stub and the first groove are formed on the front of the base.

11. The combination device as claimed in claim 1, wherein the recess is defined in the rear of the base; and the clip is pivotally attached to the rear of the base at a position near the top of the base.

12. The combination device as claimed in claim 1, wherein the recess is defined in the rear of the base; and the clip is pivotally attached to the rear of the base at a position near the bottom of the base.

13. The combination device as claimed in claim 1, wherein the recess is defined in the top of the base; and the clip is pivotally attached to the top of the base.

14. The combination device as claimed in claim 1, wherein the recess is defined in the bottom of the base; and the clip is pivotally attached to the bottom of the base.

\* \* \* \* \*